Sept. 3, 1957      D. L. HOLMES      2,805,062
HURDLE
Filed Oct. 22, 1954
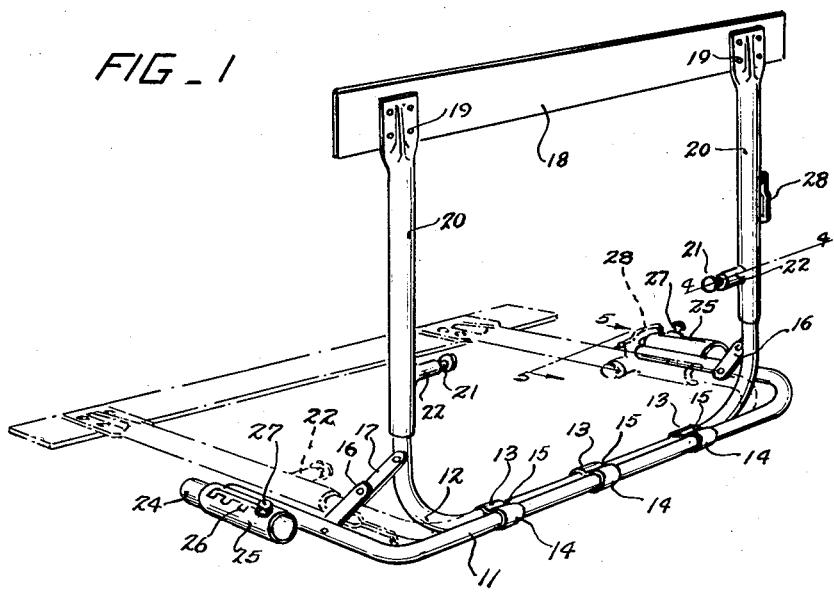
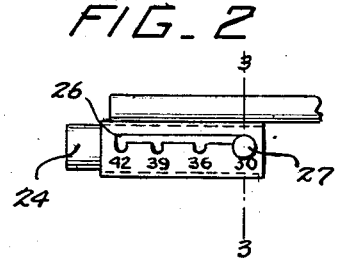
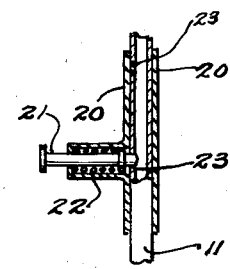
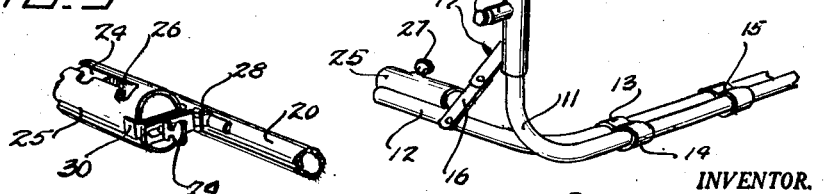
INVENTOR.
DAVID L. HOLMES
BY Edward M. Apple

United States Patent Office 2,805,062
Patented Sept. 3, 1957

2,805,062
HURDLE
David L. Holmes, Detroit, Mich.

Application October 22, 1954, Serial No. 464,036

1 Claim. (Cl. 272—59)

This invention relates to athletic equipment and has particular reference to a hurdle for use on a running track.

An object of the invention is to generally improve devices of this character and particularly to provide a hurdle which is very rugged, yet simple in construction, light in weight, readily adjustable for different heights and one which may be folded into a comparatively small space for storage and transportation.

Another object of the invention is to provide a hurdle which is provided with readily shiftable weights, whereby the tip-over resistance of the hurdle may be adjusted to offset results due to changes in height and the like.

Another object of the invention is to provide a folding and adjustable hurdle which is provided with means for quickly locking and unlocking the adjustable member.

The foregoing and other objects and advantages of the invention will become more apparent as the description proceeds, reference being made from time to time to the accompanying drawing forming part of the within disclosure, in which drawings:

Fig. 1 is a perspective view of a hurdle embodying the invention, with dotted lines to show the relative position of the parts when the device is folded.

Fig. 2 is an enlarged fragmentary detail of the weight adjusting elements.

Fig. 3 is a section taken substantially on the line 3—3 of Fig. 2.

Fig. 4 is a section taken substantially on the line 4—4 of Fig. 1.

Fig. 5 is a section taken substantially on the line 5—5 of Fig. 1.

Fig. 6 is a perspective view of a modified form of the invention.

Referring now more particularly to the drawing it will be understood that in the embodiment herein disclosed, the reference characters 11 and 12 indicate a pair of substantially U-shaped members, which are preferably made of cold-rolled steel tubing, preferably treated to resist rust and weather conditions. The members 11 and 12 are preferably secured together by means of pairs of ferrules 13 and 14, which encircle the members 11 and 12, the members of each pair being secured together as at 15 by means of welding. The ferrules 13 are securely welded to the member 12, whereas the member 11 is free to rotate in the ferrules 14, so that the members 11 and 12 may be folded into nesting relationship as shown by the dotted lines in Fig. 1. The members 11 and 12 are also connected to one another by means of pivoted connecting arms 16 and 17.

A crossbar 18 has secured to it as at 19, the tubular members 20 which are of sufficient diameter to receive the ends of the tubular member 12, so that the hurdle may be adjusted to the official heights of 30″, 36″, 39″ and 42″. In order to lock the members 20 in the different positions with respect to the member 12, I provide locking means which consist of a spring backed plunger 21 which reciprocates in fittings 22 welded to the side of each of the members 20. The plunger 21 engages spaced holes 23 formed in the tubular member 12. With this arrangement it is very easy to change the height of the hurdle by simply pulling the plungers 21 against the springs and adjusting the members 20 to the desired height and allowing the plungers to re-engage the holes in the member 12 at the adjusted height.

In order to provide various degrees of tip-over resistance to the hurdle I provide adjustable weights near the ends of the member 11. The weights 24 are preferably cylindrical and are slidably mounted in tubular members 25 which are secured by welding near the ends of the member 11. The tubular members 25 are slotted and notched as at 26, which slot and notches are arranged to receive a knurled finger-grip 27 which is threaded or otherwise secured to the weights 24. Each notch is calibrated to correspond with the weight adjusting holes 23 formed in the member 12, so that there is a corresponding weight adjustment for each height adjustment.

In order to lock the hurdle in the folded position as shown by the dotted lines in Fig. 1, I provide a hasp or similar element 28 which is secured to one of the members 20 and which is arranged to receive a flat-headed pin member 29, which is rotatably mounted on a bracket 30 (Fig. 5) secured to the end of one of the weight members 24.

In Fig. 6 I illustrate the two U-shaped tubular members 11 and 12 as being of substantially the same width, so that when the hurdle is folded the members then rest side by side instead of in a nested position as shown in Fig. 1. In this modification I prefer to position the weight adjusting elements 25 on the inside of the member 12 instead of on the outside of the member 11 as shown in Fig. 1 and in this modification the tubular members 20 engage the ends of the tubular member 11 instead of the ends of the member 12 as shown in Fig. 1 and the locking elements 21 and 22 are on the outside, instead of the inside, of the tubular elements 20 otherwise the device functions in the same manner as previously described.

It is believed that the operation of the device is obvious from the foregoing description.

Having described my invention what I claim and desire to secure by Letters Patent is:

A hurdle comprising a pair of U-shaped tubular members, one of which is smaller than the other to provide nesting, rotatably secured together along their bases by means of ferrules, whereby each may pivot with respect to the other, a cross bar, tubular elements secured to said cross bar, said last named tubular elements being spaced to receive the free ends of one of said U-shaped members, and adjustable weights positioned at the free ends of said other U-shaped member, the said adjustable weights are slideably mounted in short tubular elements secured near the free ends of said other U-shaped member, there being a notched slot in each of said last named tubular elements, for receiving a finger grip secured to each of said weights, one of said weights having an axially pivotable locking pin having a flat head at one end to be received in the slot of a hasp secured to one of the said cross bar tubular elements.

References Cited in the file of this patent

UNITED STATES PATENTS

| 1,705,745 | Anderson | Mar. 19, 1929 |
| 1,910,080 | Austin | May 23, 1933 |
| 2,509,420 | Burch | May 30, 1950 |
| 2,545,968 | Newstead | Mar. 20, 1951 |
| 2,583,786 | Marzucco | Jan. 29, 1952 |
| 2,615,500 | Thomas | Oct. 28, 1952 |
| 2,736,365 | Hines | Feb. 28, 1956 |

FOREIGN PATENTS

| 90,849 | Sweden | 1936 |
| 96,785 | Sweden | Sept. 5, 1939 |